(12) United States Patent
Clark (10) Patent No.: US 10,632,932 B2
(45) Date of Patent: Apr. 28, 2020

(54) ELECTRONIC DEVICE HOLDER

(71) Applicant: Ford Global Technologies, LLC, Dearborn, MI (US)

(72) Inventor: Scott A. Clark, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/013,358

(22) Filed: Jun. 20, 2018

(65) Prior Publication Data

US 2019/0389397 A1 Dec. 26, 2019

(51) Int. Cl.
  *B60R 11/02* (2006.01)
  *B60R 7/04* (2006.01)
  *B60R 11/00* (2006.01)

(52) U.S. Cl.
  CPC ............ *B60R 11/0241* (2013.01); *B60R 7/04* (2013.01); *B60R 2011/0007* (2013.01); *B60R 2011/0059* (2013.01); *B60R 2011/0075* (2013.01)

(58) Field of Classification Search
  CPC ..... G06F 1/1656; G06F 1/181; H05K 5/0013; H05K 5/0017; H05K 5/0204; H05K 5/0221; B60R 11/0241; B60R 2011/0007; B60R 2011/0059; B60R 2011/0075; B60R 7/04
  See application file for complete search history.

(56) References Cited

U.S. PATENT DOCUMENTS

| | | | |
|---|---|---|---|
| 4,686,745 A * | 8/1987 | Butler .................. | H05K 5/0204 206/223 |
| 5,745,565 A | 4/1998 | Wakefield | |
| 5,839,710 A | 11/1998 | Hubbard | |
| 6,932,309 B1 | 8/2005 | Corey et al. | |
| 8,246,097 B2 | 8/2012 | Beyer | |
| 8,303,016 B2 | 11/2012 | Pauken et al. | |
| 9,162,627 B2 | 10/2015 | Greiner et al. | |
| 9,900,417 B1 * | 2/2018 | Ruiz ..................... | H04M 1/667 |
| 9,986,803 B2 * | 6/2018 | Clark .................... | A45C 11/00 |
| 2005/0045681 A1 | 3/2005 | Hancock et al. | |
| 2008/0096620 A1 * | 4/2008 | Lee ....................... | G06F 1/1626 455/575.8 |
| 2011/0277892 A1 * | 11/2011 | Black ..................... | A45C 1/06 150/148 |
| 2012/0080465 A1 | 4/2012 | Son | |
| 2015/0122850 A1 * | 5/2015 | Quehl ................... | A45C 11/00 224/191 |
| 2015/0382495 A1 * | 12/2015 | Lim ...................... | A45C 11/00 206/523 |
| 2016/0082895 A1 | 3/2016 | Wirkner | |
| 2016/0183393 A1 * | 6/2016 | Groom ................... | A45C 11/00 280/33.992 |
| 2016/0281913 A1 * | 9/2016 | Tsai ...................... | H04B 1/3877 |
| 2017/0055659 A1 * | 3/2017 | Merzon .................. | A45C 11/00 |
| 2017/0068274 A1 * | 3/2017 | Van Hees ............. | G06F 1/1637 |
| 2017/0079391 A1 * | 3/2017 | Clark .................... | A45C 11/00 |
| 2018/0056887 A1 * | 3/2018 | Salter ................... | B60Q 3/225 |

* cited by examiner

*Primary Examiner* — Daniel P Wicklund
*Assistant Examiner* — Christopher L Augustin
(74) *Attorney, Agent, or Firm* — David Coppiellie; Price Heneveld LLP (57) ABSTRACT

An electronic device holder is provided comprising a housing defining a space and having an open end portion. The housing includes a first portion slidably coupled to a second portion. A flexible member is positioned around the housing. A retention feature is disposed on the second portion. The retention feature extends into the space.

17 Claims, 10 Drawing Sheets

ELECTRONIC DEVICE HOLDER

FIELD OF THE INVENTION

The present disclosure generally relates to an accessory holder, and more specifically to a holder for an electronic device.

BACKGROUND OF THE INVENTION

Personal electronic devices are rapidly growing in popularity, and, as a result, vehicle users are often looking for conveniently located and secure storage spaces in a vehicle for electronic devices. Accordingly, an electronic device holder is provided herein that is configured to securely hold the electronic device proximate the user.

SUMMARY OF THE INVENTION

According to some aspects of the present disclosure, an electronic device holder is provided that includes a housing defining an interior space and an opening. The housing includes a first portion slidably coupled to a second portion. A flexible member is positioned around the housing. A retention feature is disposed on the second portion. The retention feature extends into the interior space.

According to some aspects of the present disclosure, an electronic device holder is provided that includes a housing defining an interior space and an opening. A retention feature is defined by the housing and extends into the interior space. A flexible member is positioned around the housing.

According to some aspects of the present disclosure, an electronic device holder operably coupled to a bottom surface of a substrate is provided. The electronic device holder includes a housing defining a space and an opening. A retention feature is disposed on an inner surface of the housing and extends into the space. A flexible member is encompassing the housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
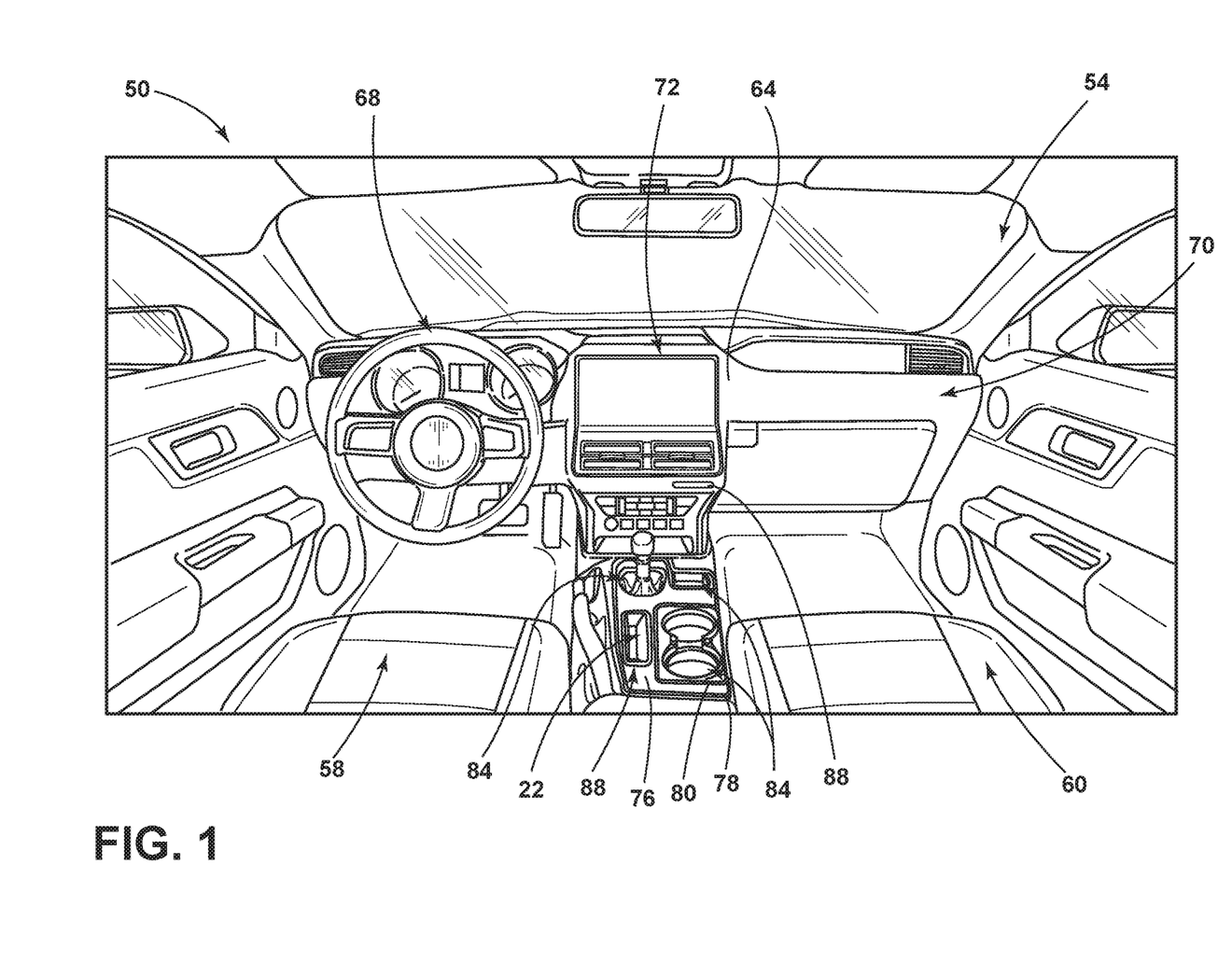
FIG. 1 is a perspective view of an interior of a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes a holder for an electronic device disposed within a vehicle interior. The holder is slidable between an open position and a closed position, wherein the force biasing the holder in the closed position is provided by a flexible member(s). When an electronic device is inserted into the holder, the holder expands against the flexible member(s) to the open position. The constant and controlled force exerted by the flexible member(s) provides stability to the electronic device and easy access to the device for the user. When the electronic device is removed, the holder reverts to the closed position.

Referring to FIGS. 1-6C, reference numeral 10 generally denotes an electronic device holder that includes a housing 14 defining a space 18 and an opening 22. The housing 14 includes a first portion 26 slidably coupled to a second portion 28. A flexible member 32 is positioned around the housing 14. A retention feature 36 is disposed on the second portion 28. The retention feature 36 extends into the space 18.

Referring now to FIG. 1, a vehicle 50 is generally illustrated having a cabin 54 including a driver side 58 and a passenger side 60. An instrument panel 64 spans laterally across the front of the cabin 54. The instrument panel 64 may be divided into a driver side portion 68, a passenger side portion 70, and a center stack portion 72. Each of these portions 68, 70, 72 may serve different functions and include various electrical and mechanical components.

Figure 2A:
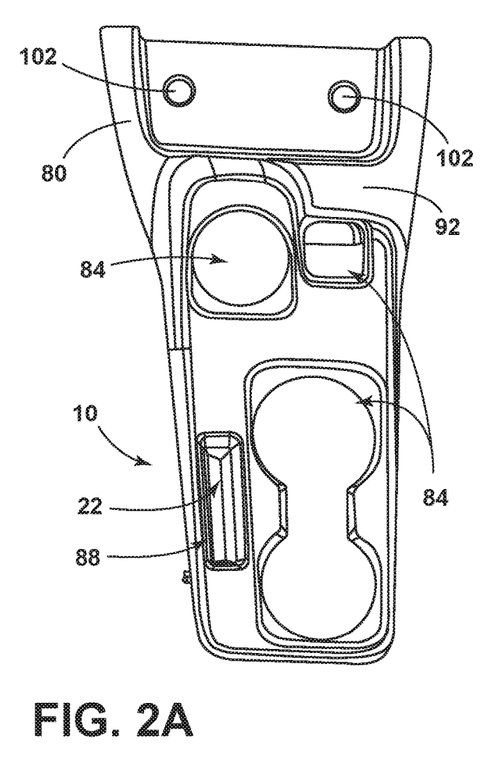
FIG. 2A is a top view of a center console and a device holder, according to some examples.
Figure 2B:
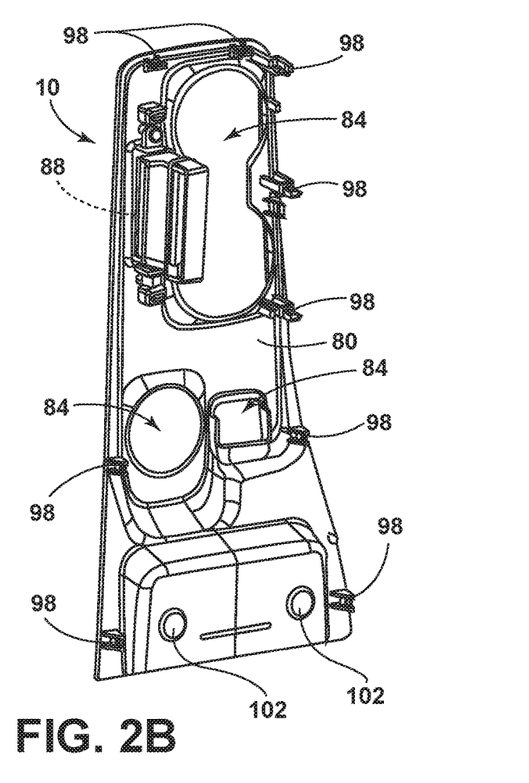
FIG. 2B is a bottom perspective view of the center console and device holder of FIG. 2A.
Figure 2C:
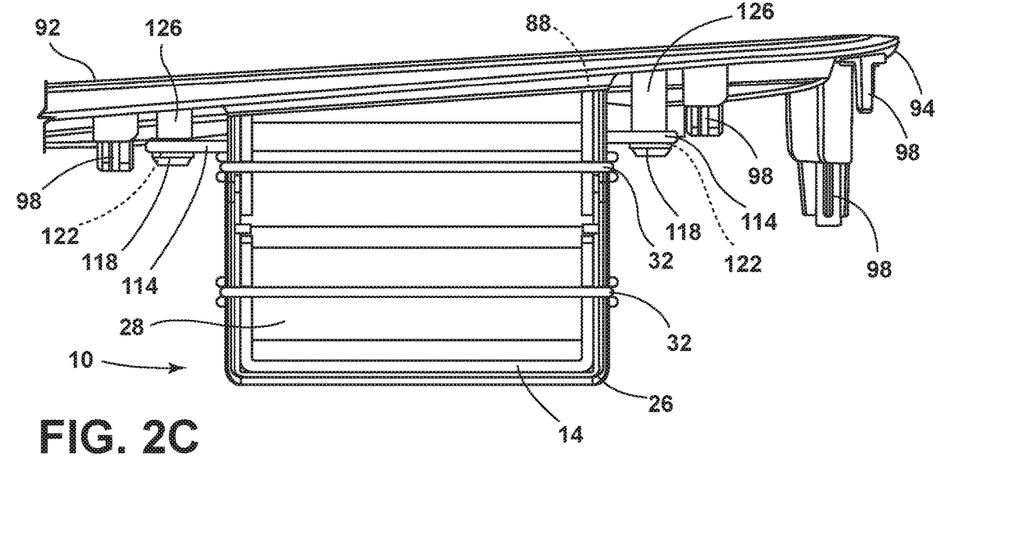
FIG. 2C is a side view of the center console and device holder of FIG. 2A.

Referring now to FIGS. 1-2B, a center console 76 may be coupled to the center stack portion 72. The center console 76 extends vehicle rearward from the center stack portion 72 and is positioned between the driver side 58 and the passenger side 60. The center console 76 includes a body portion 78 and a substrate 80 that defines various apertures 84 for receiving features such as cup holders, USB plugs, gear shifts, etc. The center console 76 additionally defines a void 88 configured to align with the opening 22 of the housing 14, as shown in FIGS. 2A-2C. The void 88 may be positioned proximate the driver side 58 of the cabin 54. It is contemplated that the housing 14 may be operably coupled with any part of the instrument panel 64, for example in the center stack portion 72, without departing from the scope of the present disclosure.

Referring now to FIGS. 2A-2C, the substrate 80 is shown having a top surface 92 and a bottom surface 94. A plurality of retaining towers 98 extends from the bottom surface 94 of the substrate 80 and are configured to secure the substrate 80 to the body portion 78 (FIG. 1). A pair of receiving apertures 102 are defined by the substrate 80 in a vehicle forward position to facilitate coupling of the center stack portion 72 to the substrate 80 and the center console 76, as shown in FIG. 1.

Figures 6A, 6B:
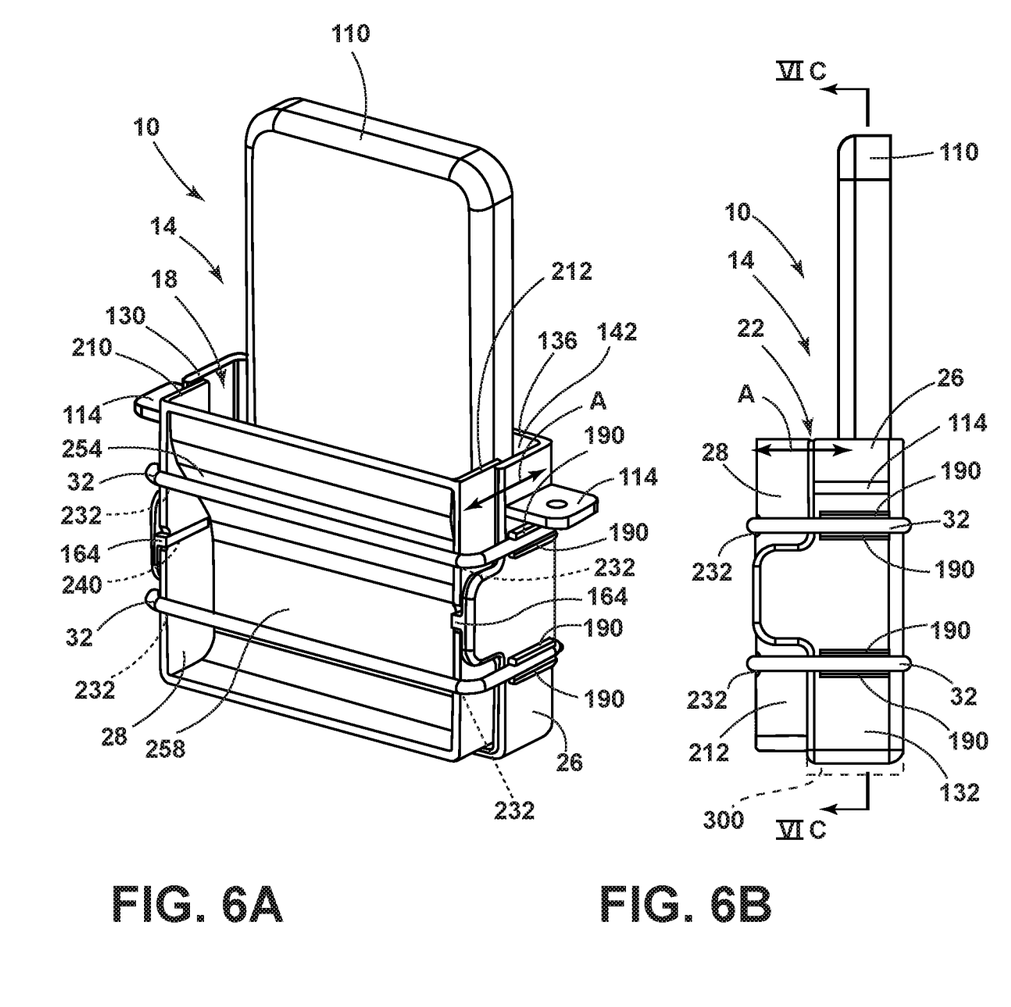
FIG. 6A is a first side perspective view of a device holder and a device, according to some examples.
FIG. 6B is a rear profile view of the device holder and device of FIG. 6A.
Figure 6C:
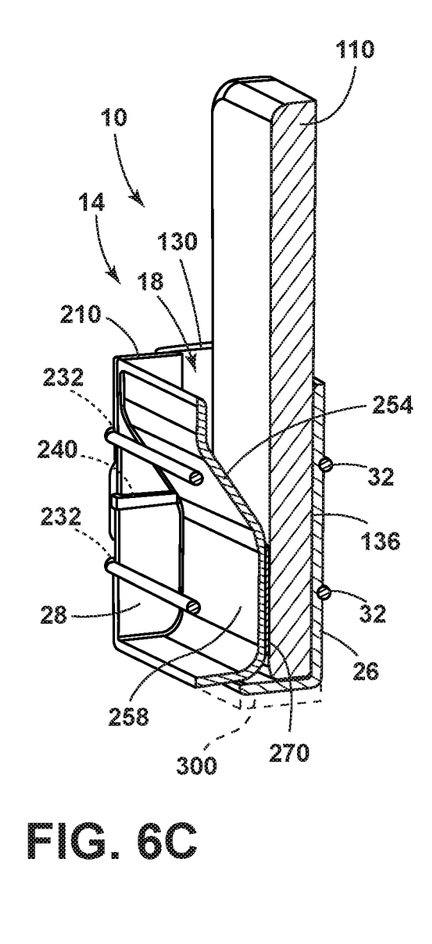
FIG. 6C is a cross-sectional view of the device holder and device of FIG. 6B taken along line VIC-VIC of FIG. 6B.

Still referring to FIGS. 2A-2C, the electronic device holder 10 is positioned below the void 88 and is secured to the bottom surface 94 of the substrate 80. The electronic device holder 10 extends downward from the substrate 80, allowing an electronic device 110 to sit at least partially below the substrate 80 when the electronic device 110 is received by the electronic device holder 10 (FIGS. 6A-6C). As shown in FIG. 2C, the electronic device holder 10 includes the housing 14 with multiple flexible members 32. The flexible members 32 extend around the housing 14, securing the first portion 26 and the second portion 28 in an engaged position. In some instances, each flexible member 32 may partially or fully encompass the first and second portions 26, 28. It is contemplated that any number of flexible members 32 may be used without departing from the scope of the present disclosure. Flanges 114 extend from the housing 14 and are positioned above the flexible members 32. The flanges 114 are coupled to the substrate 80 by fasteners 118 extending through apertures 122 defined by the flanges 114. The fasteners 118 are received by receiving wells 126 defined by the bottom surface 94 of the substrate 80.

Figure 3A:
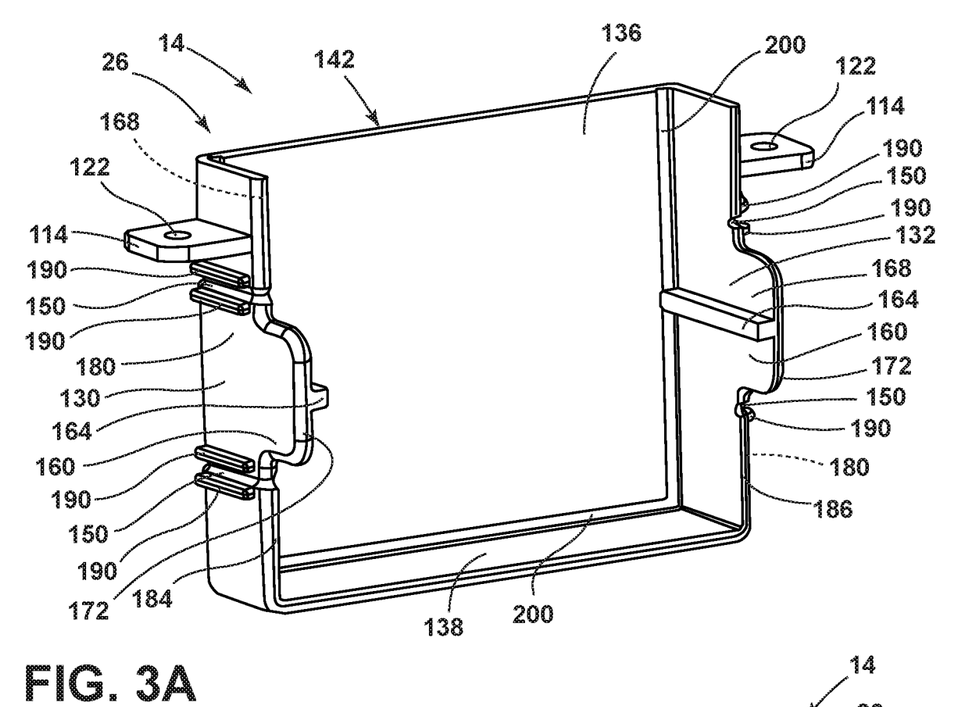
FIG. 3A is a first side perspective view of a first portion of a device holder, according to some examples.
Figure 3B:
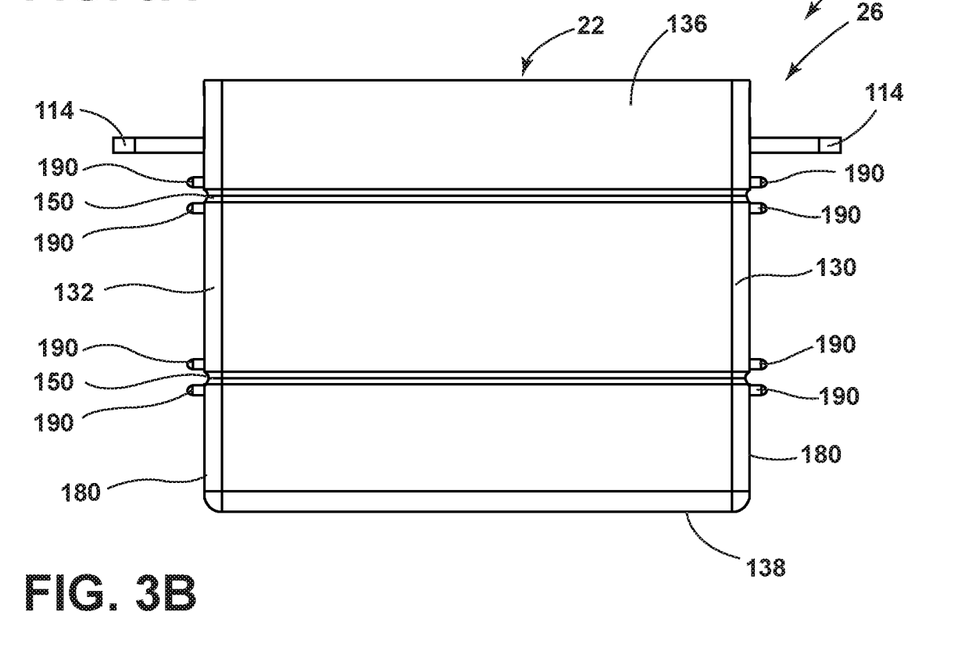
FIG. 3B is a second side profile view of the first portion of the device holder of FIG. 3A.
Figure 5A:
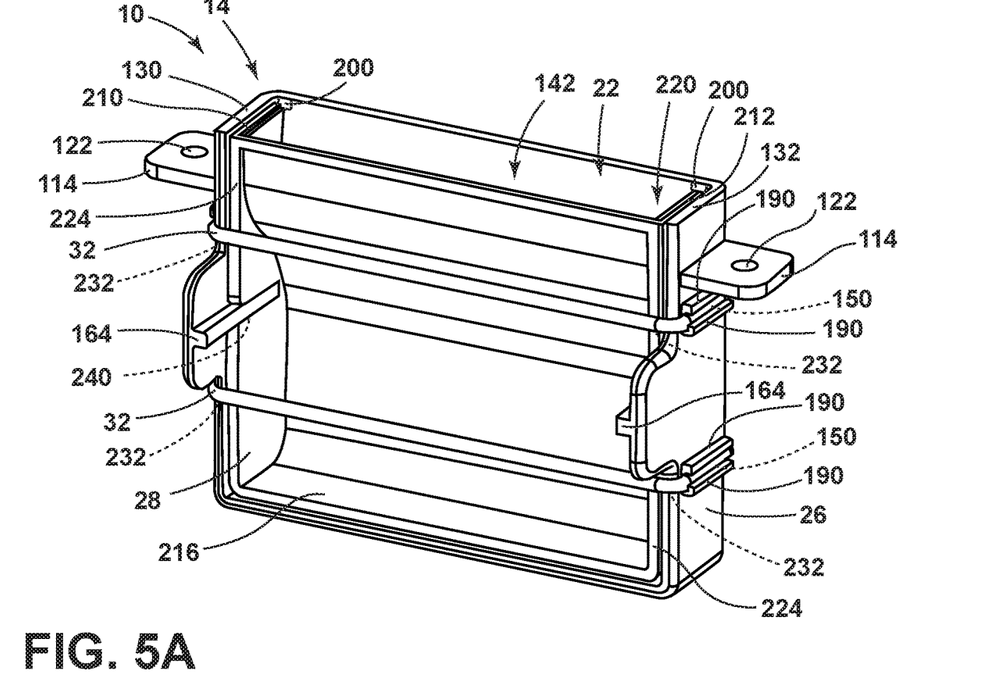
FIG. 5A is a first side perspective view of a device holder, according to some examples.
Figure 5B:
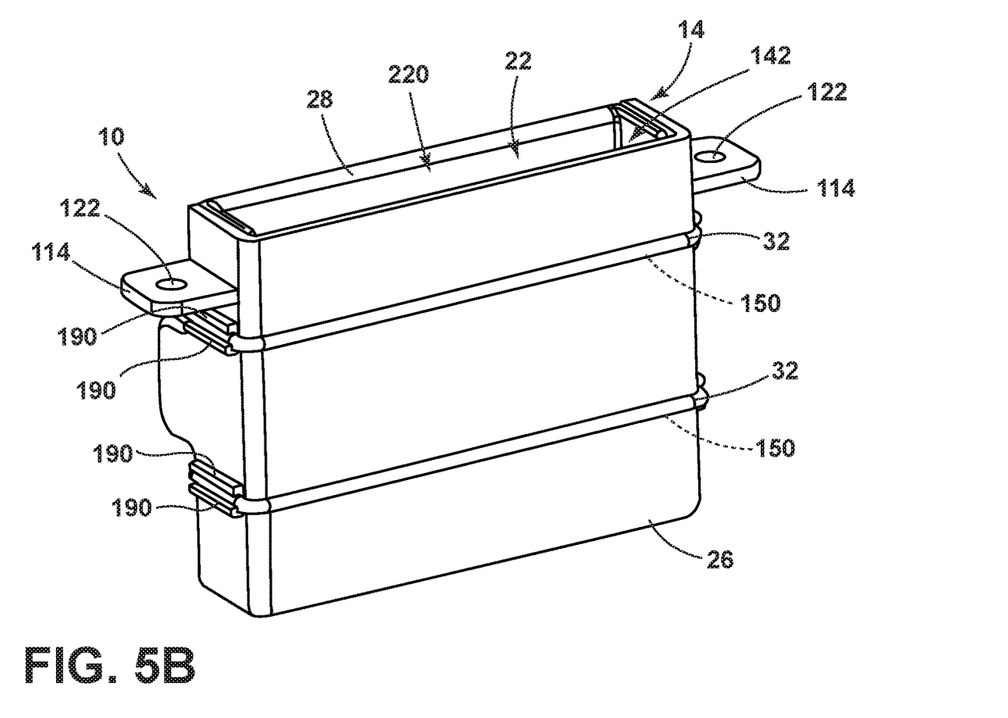
FIG. 5B is a second side perspective view of the device holder of FIG. 5A.

Referring now to FIGS. 3A and 3B, in some examples, the first portion 26 of the housing 14 includes a first exterior side 130 and a second exterior side 132 joined by a first central section 136. A first bottom surface 138 extends from the base of the first exterior side 130 to the base of the second exterior side 132 and is operably coupled to the first central section 136. The first bottom surface 138, the first and second exterior sides 130, 132, and the first central section 136 define a first space 142 configured to be partially enclosed when the electronic device holder 10 is fully assembled (FIGS. 5A-5B).

As previously discussed elsewhere herein, each of the first exterior side 130 and the second exterior side 132 include flanges 114. The flanges 114 define the apertures 122 configured to facilitate coupling the housing 14 to the substrate 80 (FIGS. 2A-2C) and may be generally rectangular with radiused corners. The flanges 114 are positioned proximate the opening 22 of the housing 14 and above a guide 150. However, it is contemplated that the flanges 114 may be of any shape or size and/or located in any position on the first and second exterior sides 130, 132, depending on the configuration of the substrate 80 and the housing 14. Additionally, it is contemplated that the apertures 122 may be of any shape or size to accommodate the fasteners 118 for securing the housing 14 to the substrate 80, as shown in FIGS. 2A-2C. It is also contemplated that clips, plastic welding, or any other type of retaining may be used to secure the housing 14 to the substrate 80 without departing from the scope of the present disclosure.

Each of the first exterior side 130 and the second exterior side 132 include an extension 160 protruding away from the first central section 136. Each extension 160 includes radiused corners and may include beveled edges. Each extension 160 extends a predetermined distance from the one of the first exterior side 130 and the second exterior side 132. A protrusion 164 extends inwardly from an inner surface 168 of each of the first and second exterior sides 130, 132. It will be understood that the use of a pair of protrusions is exemplary, and it is contemplated that any number of protrusions may be used. The protrusion 164 begins at the first central section 136 and extends along the inner surface 168 of one of the first exterior side 130 and the second exterior side 132 to an outer end portion 172 of the extension 160. The protrusion 164 is perpendicular to the inner surface 168 of the exterior side 130, 132 and extends a predetermined distance from the inner surface 168. The protrusion 164 has a generally rectangular cross-section. However, it is contemplated that the protrusion 164 may have a cross-section of any shape without departing from the scope of the present disclosure. It is also contemplated that features to facilitate sliding along the protrusion 164 (e.g., wheels) may be used.

Each of the first exterior side 130 and the second exterior side 132 also include the guide 150 defined by an outer surface 180 of each of the first and second exterior sides 130, 132. The guide 150 may be molded into the outer surface 180 of the first portion 26 or added after molding. The guide 150 extends from a first edge 184 of the first portion 26, along the first exterior side 130, across the first central section 136, and along the second exterior side 132 and to a second edge 186. The guide 150 is generally parallel with the opening 22 and the first bottom surface 138 and has a generally semi-circular cross-section. However, it is contemplated that the guide 150 may have a cross-section of any shape including rectangular, trapezoidal, semi-elliptical, etc. A pair of partitions 190 is positioned to frame the guide 150. The partitions 190 substantially prevent the inadvertent release or separation of the flexible member 32 from the guide 150 and consequentially the housing 14 when the electronic device 110 is disposed within the housing 14 (FIGS. 6A-6C). Each partition 190 extends perpendicularly to the outer surface 180 of one of the first exterior side 130 and the second exterior side 132. The partitions 190 are spaced from one another to retain the flexible member 32 within the guide 150 while also allowing the flexible member 32 to deflect according to movement of the housing 14.

The inner surface 168 of each of the first and the second exterior sides 130, 132 is operably coupled with the first central section 136. At the joinder, a buffer edge 200 may be positioned extending away from the first central section 136. The buffer edge 200 may be any material configured to cushion against force pressing into the first central section 136. The buffer edge 200 may extend any distance into the first space 142, and may further extend along the joinder of the first bottom surface 138 and the first central section 136. It will be understood that the buffer edge 200 is optional and may be removed in some examples.

Figure 4A:
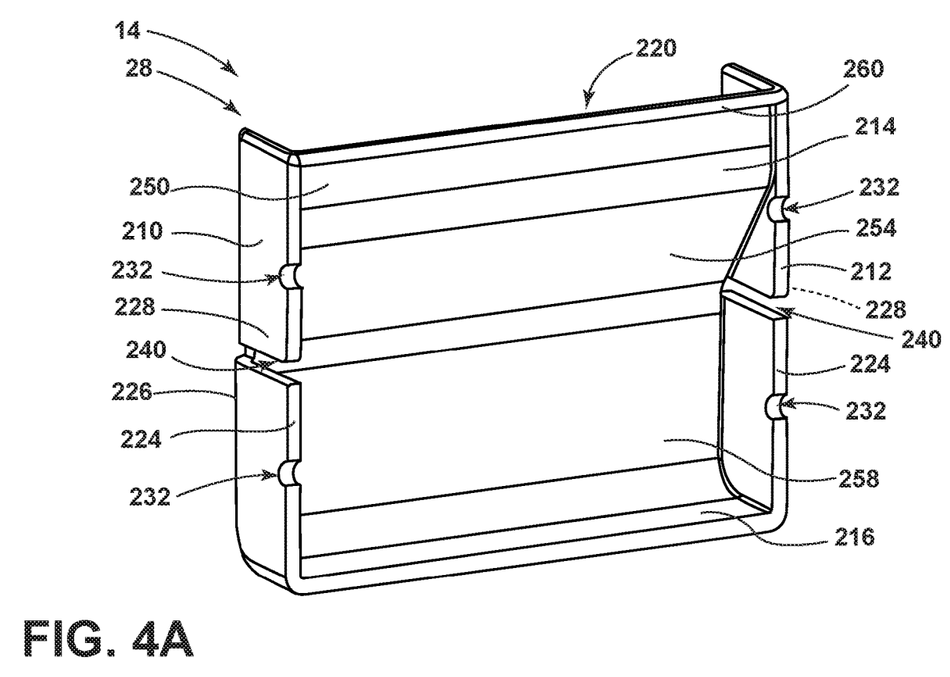
FIG. 4A is a first side perspective view of a second portion of a device holder, according to some examples.
Figure 4B:
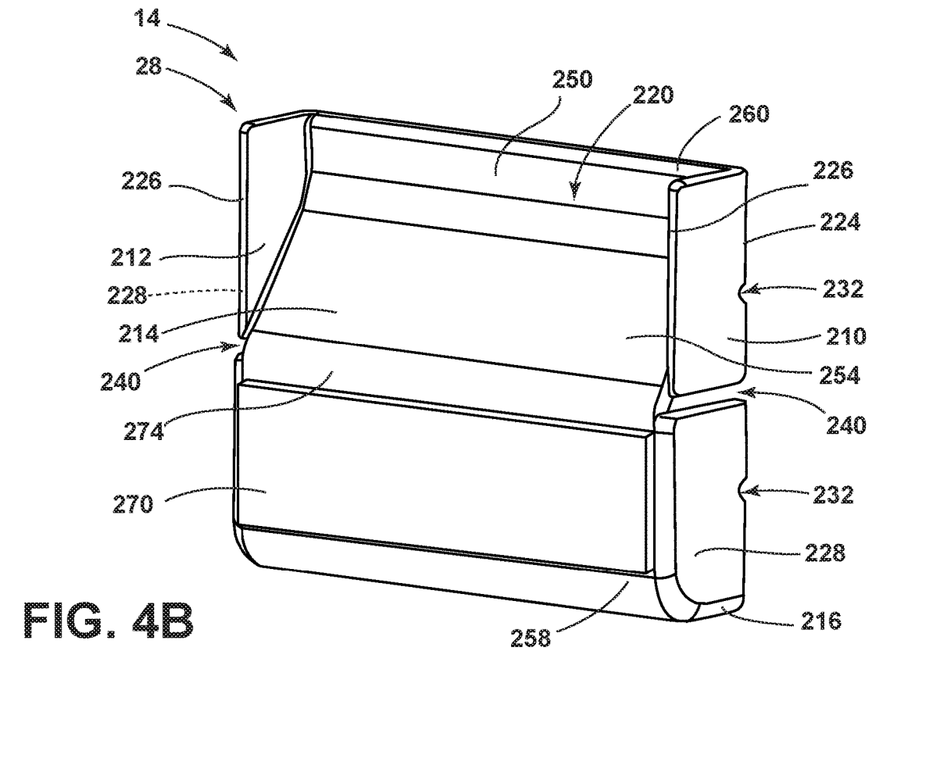
FIG. 4B is a second side perspective view of the second portion of the device holder of FIG. 4A.

Referring now to FIGS. 4A and 4B, the second portion 28 of the housing 14 includes a first interior side 210 and a second interior side 212 joined by a second central section 214. A second bottom surface 216 extends from the base of the first interior side 210 to the base of the second interior side 212 and is operably coupled to the second central section 214. The second bottom surface 216, the first and second interior sides 210, 212, and the second central section 214 define a second space 220 configured to be partially enclosed when the electronic device holder 10 is fully assembled (FIGS. 5A and 5B).

Each of the first and second interior sides 210, 212, includes an outer edge 224 and inner edge 226 spanned by an outer surface 228. The outer edge 224 of each of the first and second interior sides 210, 212 defines a notch 232 configured to receive the flexible member 32, as shown in FIGS. 5A and 5B. The notch 232 is generally of the same cross-sectional shape as the guide 150 (e.g., rectangular, semi-circular, etc.). However, it is contemplated that the notch 232 may have a cross-section different from that of the guide 150 (FIGS. 3A and 3B) without departing from the scope of the present disclosure. Further, the notch 232 extends a predetermined distance from the outer edge 224 of one of the first and second interior sides 210, 212 to the respective inner edge 226. It will be understood that the notch 232 may extend any distance from the outer edge 224 toward the inner edge 226 allowed by the positioning of the second central section 214.

Further, each of the first and second interior sides 210, 212 defines a channel 240. Each of the channels 240 spans from the respective outer edge 224 to the respective inner edge 226. Each channel 240 has the same dimensions and cross-sectional shape as the protrusions 164 of the first and second exterior sides 130, 132, as each channel 240 is configured to receive the respective protrusion 164 of the first portion 26 (FIGS. 5A and 5B). It is contemplated that, in some examples, features to facilitate movement through the channel 240 may be used, including, for example, a track rail or wheels. It is also contemplated that the channel 240 may include a stop positioned on the outer edge 224 to prevent movement through the channel 240 without bound.

The second portion 28 of the housing 14 includes the second central section 214 having an upper portion 250, an angled portion 254, and a lower portion 258. The upper portion 250 extends downward a predetermined distance from an upper edge 260 of the second portion 28. The upper portion 250 is substantially aligned with the outer edge 224 of the first and second interior sides 210, 212. However, it is contemplated that the upper portion 250 may be spaced away from and parallel to the outer edges 224 of the first and second interior sides 210, 212 without departing from the scope of the present disclosure. The upper portion 250 is integrally formed with the angled portion 254 at a radiused corner. The angled portion 254 extends into the second space 220, spanning from the outer edges 224 of the first and second interior sides 210, 212 to the inner edges 226 of the first and second interior sides 210, 212. The lower portion 258 is also integrally formed with the angled portion 254, extending downward from the angled portion 254 to the second bottom surface 216. The lower portion 258 and the angled portion 254 together define the non-linear retention feature 36 of the second portion 28. The retention feature 36 includes a first portion, or the angled portion 254, proximate the opening 22 extending a first distance into the space 18 and a second portion, or the lower portion 258, disposed on an opposing side of the first portion 254 from the opening 22 extending a second distance into the space 18, the second distance greater than the first distance. The lower portion 258 may be substantially aligned with the inner edges 226 of the first and second interior sides 210, 212. However, it is contemplated that the lower portion 258 may be spaced away from and parallel to the inner edges 226 of the first and second interior sides 210, 212 without departing from the scope of the present disclosure. The lower portion 258 is also integrally formed with the second bottom surface 216 at a radiused corner joinder extending from the first interior side 210 to the second interior side 212.

A buffer pad 270 may be operably coupled to an inner surface 274 of the lower portion 258. The buffer pad 270 extends from the first interior side 210 to the second interior side 212 and from the angled portion 254 to the second bottom surface 216. The buffer pad 270 may be any material configured to cushion a force pressing against the second central section 214, and it may extend any distance from the inner surface 274 of the lower portion 258. The buffer pad 270 may assist in preventing noise vibration harshness (NVH), wear, and other issues caused by the proximity of the surfaces.

Referring now to FIGS. 5A and 5B, the housing 14 is shown assembled with the second portion 28 of the housing 14 received into the first space 142 defined by the first portion 26. Together, the first space 142 defined by the first portion 26 and the second space 220 defined by the second portion 28 communicate to form the space 18 of the housing 14 configured to receive the electronic device 110 through the opening 22 (FIGS. 6A-6C). The first and second interior sides 210, 212 are positioned substantially flush with the first and second exterior sides 130, 132 respectively, and the second bottom surface 216 of the second portion 28 is positioned substantially flush with the first bottom surface 138 of the first portion 26. The protrusions 164 extending from the first and second exterior sides 130, 132 of the first portion 26 are received by the channels 240 defined by the first and second interior sides 210, 212 of the second portion 28. The first portion 26 and the second portion 28 may each be formed from a polypropylene material to facilitate sliding of the second portion 28 relative to the first portion 26. Polypropylene may be used to minimize noise, squeak, rattle, (NSR) and/or other sound issues. It will be appreciated that any other practicable material may be used without departing from the teachings provided herein. As previously discussed elsewhere herein, the buffer edge 200 extending along the interior of the first portion 26 cushions the movement of the second portion 28 along and prevents direct contact of the inner edge 226 of the first and second interior sides 210, 212 with the first central section 136.

The first portion 26 and the second portion 28 are maintained in an engaged position by the flexible members 32. The flexible members 32 may be any elastic or flexible member configured to encircle or encompass an object and provide a force pressing inward on the object (e.g., an elastic band). The flexible members 32 may be made of any type of flexible and/or elastic material including, for example, rubber, elastic fabrics, stretch vinyl, or nylon. The flexible members 32 are received by the guides 150 defined by the first portion 26 of the housing 14 and wrap around the exterior of the housing 14. The notches 232 defined by the outer edges 224 of the second portion 28 of the housing 14 also receive the flexible members 32, holding the flexible members 32 in place as the flexible members 32 stretch across the second portion 28. The partitions 190 extending along the first and second exterior sides 130, 132 secure the flexible members 32 within the guides 150. As discussed elsewhere herein, the partitions 190 are configured to prevent the inadvertent release or sliding of the flexible members 32. The partitions 190 are positioned to allow for enough space to securely hold the flexible member 32 between the two partitions 190. It is also contemplated that the partitions 190 may include retention features (e.g., brackets or ribbing) for securing the flexible member 32.

Referring now to FIGS. 6A-6C, when the electronic device 110 is received into the opening 22, the second portion 28 of the housing 14 slides apart from the first portion 26 along arrow A. The angled portion 254 provides a tapered surface to facilitate insertion of the electronic device 110 into the housing 14. The electronic device 110 is held in place between the first central section 136 of the first portion 26 and the buffer pad 270 of the lower portion 258 of the second portion 28. The flexible members 32 stretch to allow the second portion 28 to slide outward along the protrusions 164 to accommodate the electronic device 110. The flexible members 32 also provide a force, pressing the electronic device 110 between the buffer pad 270 and the first central section 136. When the electronic device 110 is removed, the flexible members 32 bias the second portion 28 back into contact with the first portion 26.

Referring now to FIGS. 7A-10B, an electronic device holder 10a is depicted. The electronic device holder 10a is similar to the electronic device holder 10 (see FIGS. 2A-6B), respectively, and like-numbered elements have the same or substantially similar functions and structures.

Figure 7A:
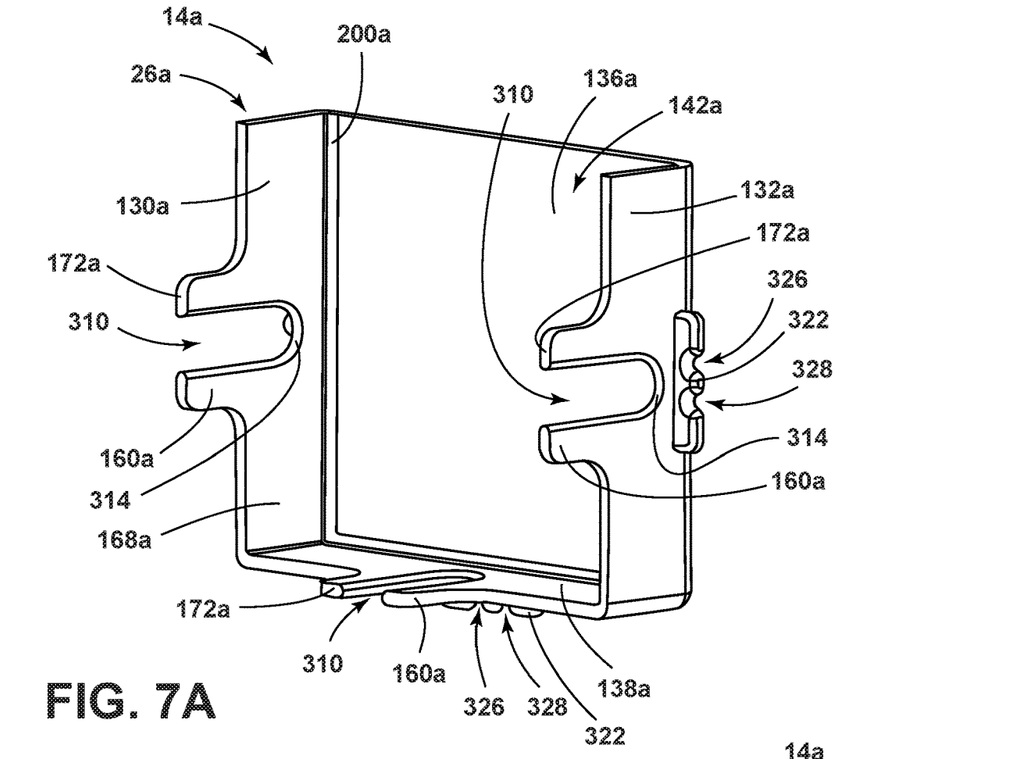
FIG. 7A is a first side perspective view of a first portion of a device holder, according to some examples.
Figure 7B:
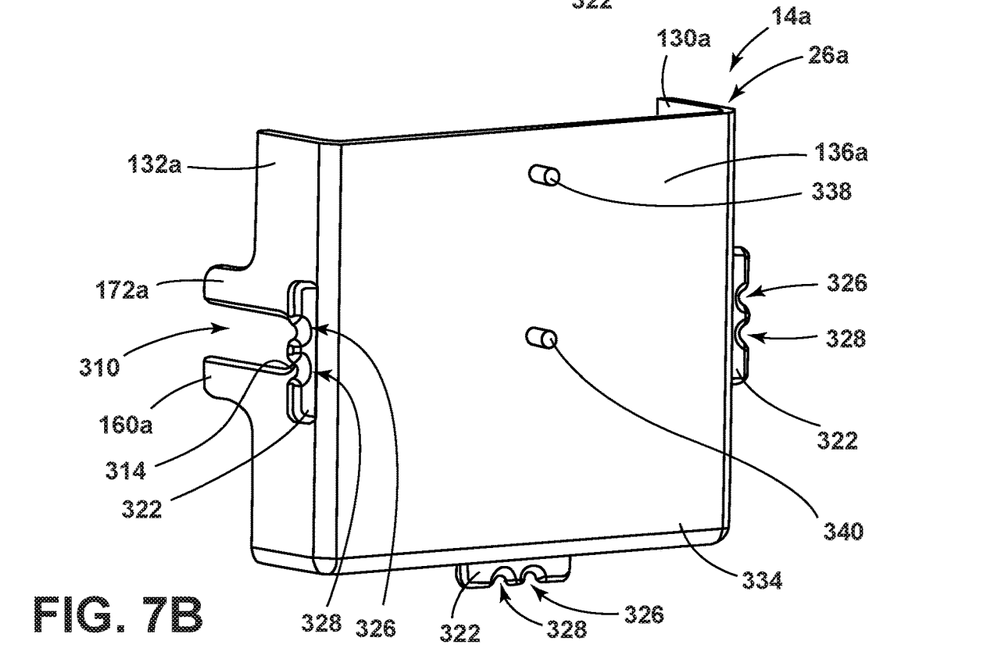
FIG. 7B is a second side profile view of the first portion of the device holder of FIG. 7A.
Figure 9A:
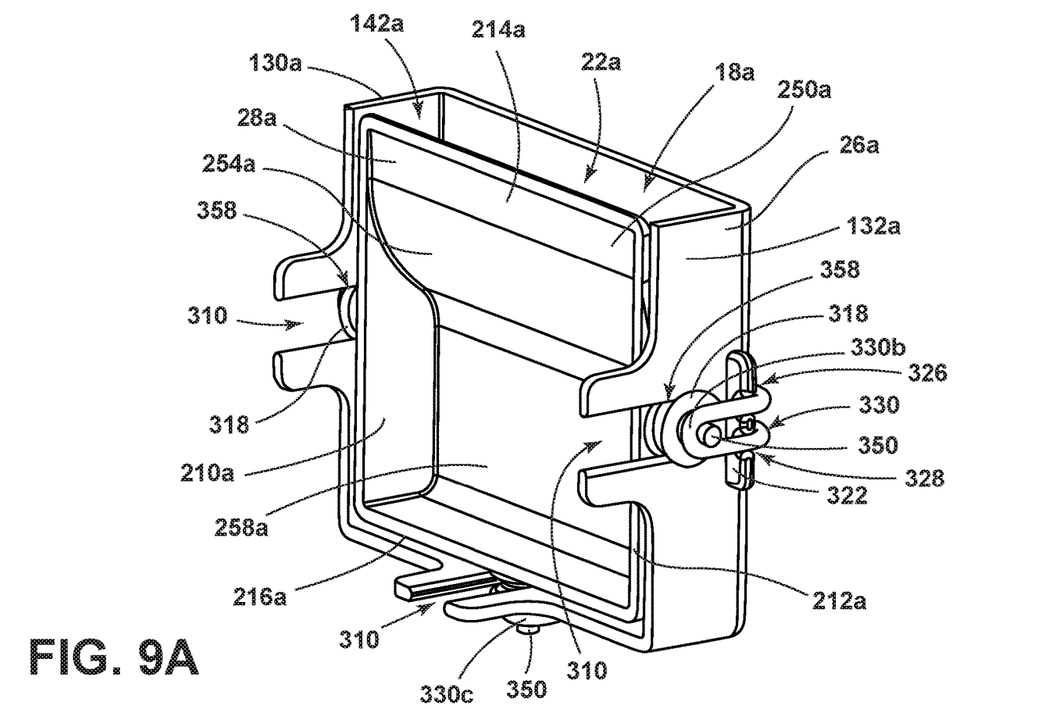
FIG. 9A is a first side perspective view of a device holder, according to some examples.
Figure 9B:
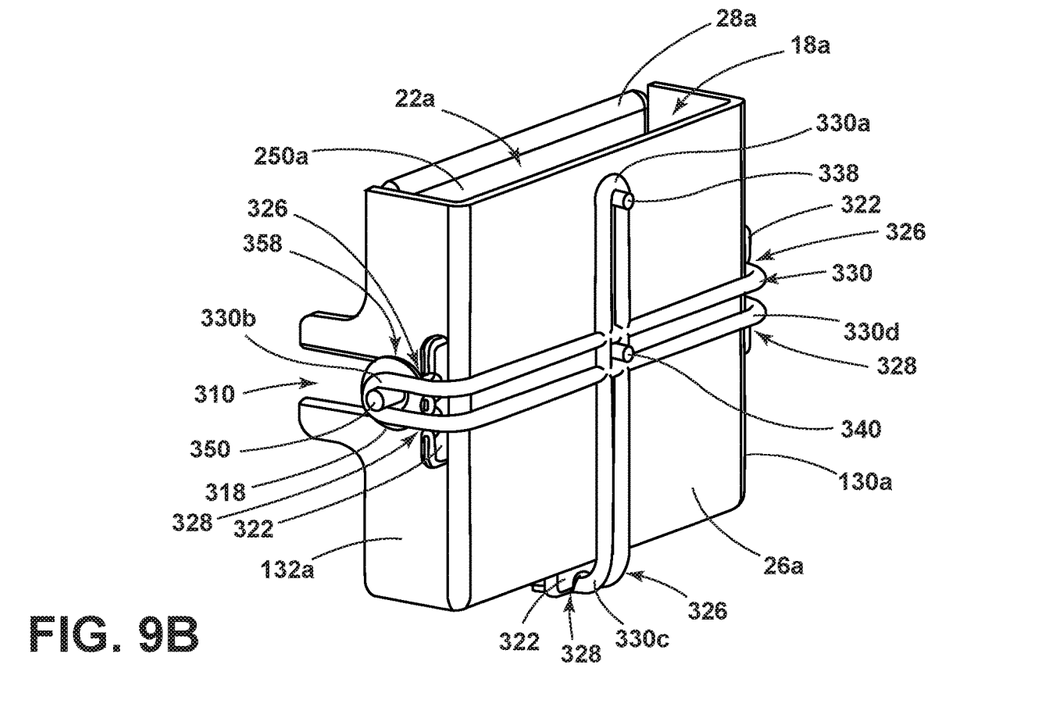
FIG. 9B is a second side perspective view of the device holder of FIG. 9A.

Referring now to FIGS. 7A and 7B, in some examples, a first portion 26a of the housing 14a includes a first exterior side 130a and a second exterior side 132a joined by a first central section 136a. A first bottom surface 138a extends from the base of the first exterior side 130a to the base of the second exterior side 132a and is operably coupled to the first central section 136a. The first bottom surface 138a, the first and second exterior sides 130a, 132a, and the first central section 136a define a first space 142a configured to be partially enclosed when the electronic device holder 10a is fully assembled (FIGS. 9A and 9B).

Each of the first exterior side 130a, the second exterior side 132a, and the bottom surface 136a includes an extension 160a protruding away from the first central section 136a. Each extension 160a includes radiused corners and may include beveled edges. Each extension 160a extends a predetermined distance from one of the first exterior side 130a, the second exterior side 132a, and the bottom surface 138a. A receiving slot 310 extends inwardly from an outer end portion 172a of each of the extensions 160a of the first and second exterior sides 130a, 132a and the bottom surface 138a. Each receiving slot 310 may include a rounded end portion 314 and is configured to receive one of a plurality of roller wheels 318 (FIGS. 9A and 9B). The receiving slot 310 is of a width equal to the diameter of each of the roller wheels 318 (FIGS. 9A and 9B).

Each of the first exterior side 130a, the second exterior side 132a, and the bottom surface 138a also includes a prop 322. Each prop 322 is positioned proximate the rounded end portion 314 of one of the receiving slots 310 and extends laterally from the respective first exterior side 130a, second exterior side 132a, or bottom surface 138a. Each prop 322 defines a pair of notches 326, 328 configured to receive a flexible member 330 (FIGS. 9A-10B). Each of the notches 326, 328 generally has a semi-circular cross-sectional shape. However, it is contemplated that the notches 326, 328 may have various cross-sectional shapes (e.g., rectangular, semi-circular, etc.) without departing from the scope of the present disclosure.

A rear surface 334 of the first portion 26a may also include first and second guide pins 338, 340 for guiding and securing the flexible member 330 (FIGS. 9A-10B). The guide pins 338, 340 extend outwardly from the rear surface 334 and are positioned in line with the prop 322 on the bottom surface 138a.

In some examples, the inner surface 168a of each of the first and the second exterior sides 130a, 132a is operably coupled with the first central section 136a. At the joinder, a buffer edge 200a may be positioned extending away from the first central section 136a. The buffer edge 200a may be any material configured to cushion against force pressing into the first central section 136a. The buffer edge 200a may extend any distance into the first space 142, and may further extend along the joinder of the first bottom surface 138 and the first central section 136. It will be understood that the buffer edge 200a is optional and may be removed in some examples.

Figure 8:
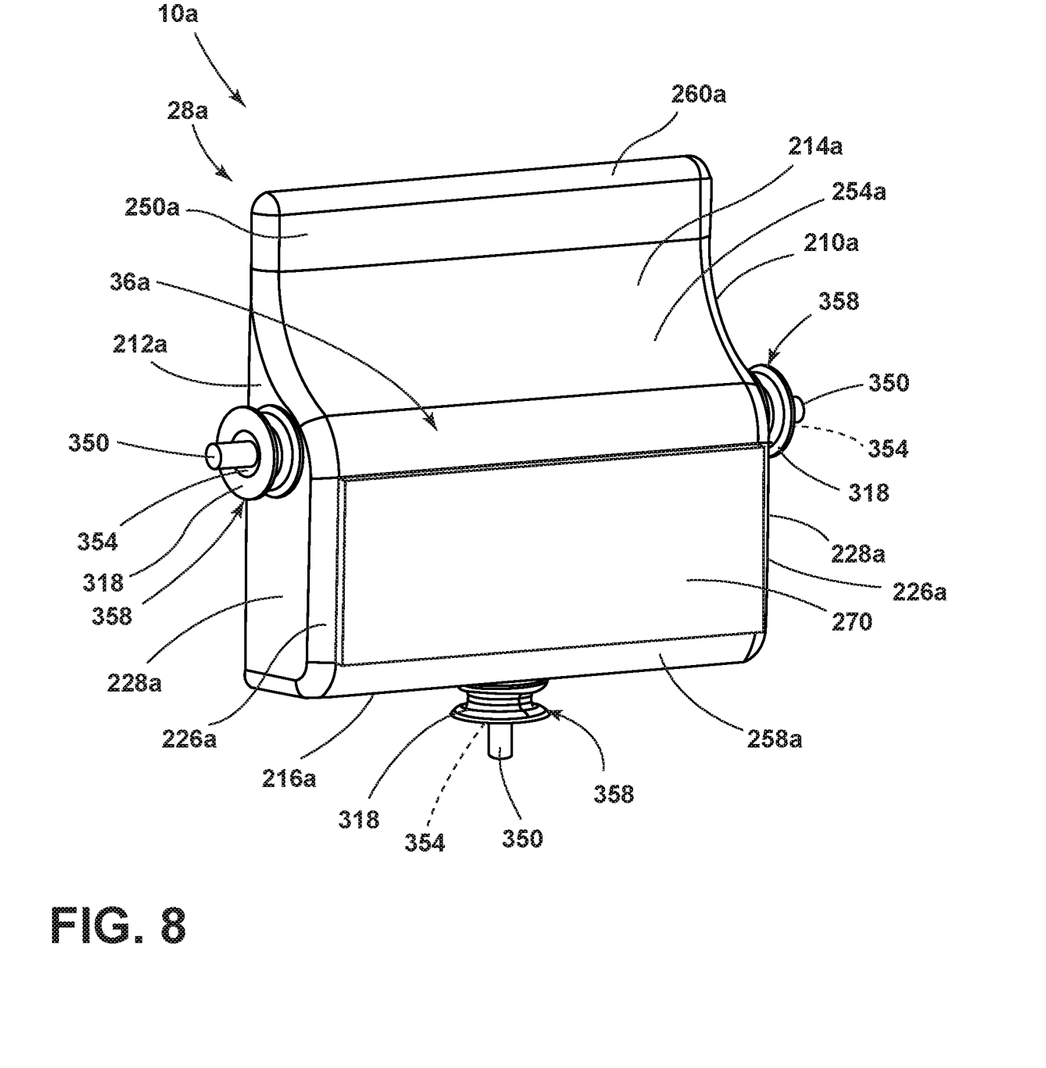
FIG. 8 is a side perspective view of a second portion of a device holder, according to some examples.

Referring now to FIG. 8, the second portion 28a of the housing 14a includes a first interior side 210a and a second interior side 212a joined by a second central section 214a. A second bottom surface 216a extends from the base of the first interior side 210a to the base of the second interior side 212a and is operably coupled to the second central section 214a. Each of the first and second interior sides 210a, 212a and the second bottom surface 216a includes an outer surface 228a. A prong 350 extends from the outer surface 228a of each of the first and second interior sides 210a, 212a and the second bottom surface 216a. Each prong 350 is configured to be received by a well 354 defined by one of the roller wheels 318. Each roller wheel 318 further includes a circumferential channel 358 configured to receive the edges of the respective receiving slot 310 of the first portion 26a (FIGS. 9A and 9B), and each of the roller wheels 318 is configured to rotate about the respective prong 350 to facilitate movement of the second portion 28a.

The second portion 28a of the housing 14a includes the second central section 214a having an upper portion 250a, an angled portion 254a, and a lower portion 258a. The upper portion 250a extends downward a predetermined distance from an upper edge 260a of the second portion 28a. The upper portion 250a is integrally formed with the angled portion 254a, and the angled portion 254a extends at an angle inwardly away from the upper portion 250a. The lower portion 258a is also integrally formed with the angled portion 254a, extending downward from the angled portion 254a to the second bottom surface 216a. The lower portion 258a and the angled portion 254a together define the non-linear retention feature 36a of the second portion 28a. The retention feature 36a includes a first portion, or the angled portion 254a, extending a first distance into the space 18a and a second portion, or the lower portion 258a, disposed on an opposing side of the first portion 254a from the upper portion 250a and extending a second distance into the space 18a, the second distance greater than the first distance. The lower portion 258a may be substantially aligned with inner edges 226a of the first and second interior sides 210a, 212a. However, it is contemplated that the lower portion 258a may be spaced away from and parallel to the inner edges 226a of the first and second interior sides 210a, 212a without departing from the scope of the present disclosure. The lower portion 258a is also integrally formed with the second bottom surface 216a at a radiused corner joinder extending from the first interior side 210a to the second interior side 212a.

A buffer pad 270a may be operably coupled to the lower portion 258a. The buffer pad 270a extends from the first interior side 210a to the second interior side 212a and from the angled portion 254a to the second bottom surface 216a. The buffer pad 270a may be any material configured to cushion a force pressing against the second central section 214a. The buffer pad 270a may assist in preventing noise vibration harshness (NVH), wear, and other issues caused by the proximity of the surfaces.

Figures 10A, 10B:
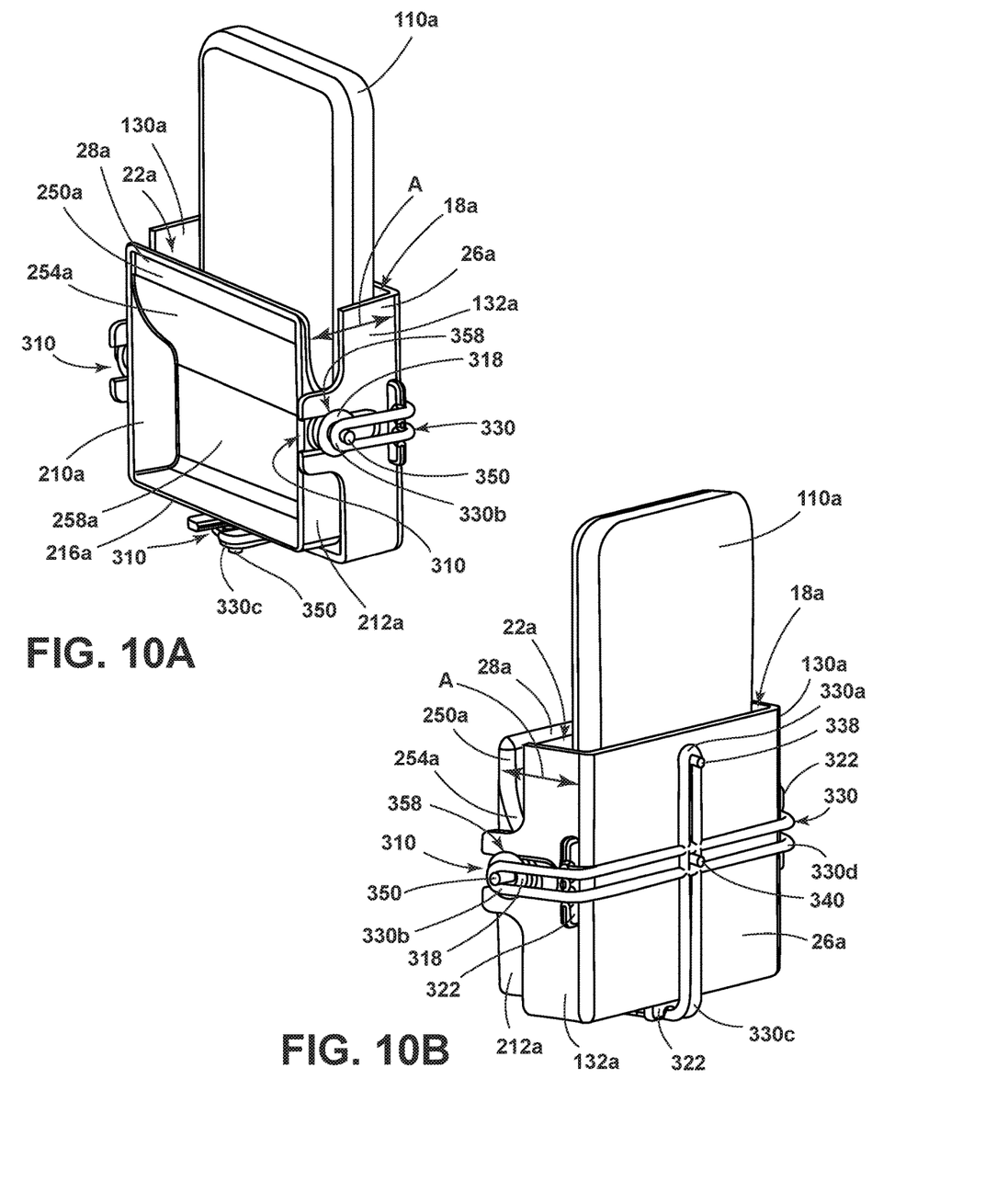
FIG. 10A is a first side perspective view of a device holder and a device, according to some examples.
FIG. 10B is a rear profile view of the device holder and device of FIG. 10A.

Referring now to FIGS. 9A and 9B, the housing 14a is shown assembled with the second portion 28a of the housing 14a received into the first space 142a defined by the first portion 26a. The first portion 26a and the second portion 28a together define the space 18a of the housing 14a configured to receive an electronic device 110a (FIGS. 10A and 10B). The first and second interior sides 210a, 212a are positioned substantially flush with the first and second exterior sides 130a, 132a respectively, and the second bottom surface 216a of the second portion 28a is positioned substantially flush with the first bottom surface 138a of the first portion 26a. The roller wheels 318 operably coupled to the first and second interior sides 210a, 212a and the second bottom surface 216a of the second portion 28a are received by the receiving slots 310 defined by the first and second interior sides 130a, 132a and the bottom surface 138a of the first portion 26a. Similarly, the circumferential channels 358 of the roller wheels 318 receive the edges of the respective receiving slots 310. The roller wheels 318 roll along the respective receiving slots 310 as the second portion 28a slides relative to the first portion 26a. The first portion 26 and the second portion 28 may each be formed from a polypropylene material to facilitate sliding of the second portion 28 relative to the first portion 26. Polypropylene may be used to minimize noise, squeak, rattle, (NSR) and/or other sound issues. It will be appreciated that any other practicable material may be used without departing from the teachings provided herein.

The first portion 26a and the second portion 28a are maintained in an engaged position by the flexible member 330. The flexible member 330 may be made of any type of flexible and/or elastic material including, for example, rubber, elastic fabrics, stretch vinyl, or nylon. The flexible member 330 includes four end portions 330a, 330b, 330c, 330d. The first end portion 330a is coupled with the first guide pin 338. The second end portion 330b is coupled with the prong 350 supporting the roller wheel 318 of the second interior side 212a. The second end portion 330b pulls the prong 350 and biases the roller wheel 318 into engagement with the receiving slot 310 of the second exterior side 132a. The third end portion 330c is coupled with the prong 350 supporting the roller wheel 318 of the second bottom surface 216a. Similarly to the second end portion 330b, the third end portion pulls the prong 350 and biases the roller wheel 319 into engagement with the receiving slot 310 of the first bottom surface 138a. The fourth end portion 330d is coupled with the prong 350 supporting the roller wheel 318 of the first interior side 210a. Similarly to the second and third end portions 330b, 330c the fourth end portion 330d pulls the prong 350 and biases the roller wheel 318 into engagement with the receiving slot 310 of the first exterior side 130a. The first, second, third, and fourth end portions 330a, 330b, 330c, 330d are joined at a center space 332 of the flexible member 330. The center space 332 is coupled with the second guide pin 340 to prevent inadvertent release or sliding of the flexible member 330. Each of the four end portions 330a, 330b, 330c, 330d are received by the notches 326, 328 of the respective prop 322 to further prevent inadvertent release or sliding of the flexible member 330. It is also contemplated that retention features (e.g., brackets or ribbing) may be used for securing the flexible member 330 without departing from the scope of the present disclosure.

Referring now to FIGS. 10A and 10B, when the electronic device 110a is received into the opening 22a, the second portion 28a of the housing 14a slides apart from the first portion 26a along arrow A. The angled portion 254a provides a tapered surface to facilitate insertion of the electronic device 110a into the housing 14a. The electronic device 110a is held in place between the first central section 136a of the first portion 26a and the lower portion 258a of the second portion 28a. The flexible member 330 stretches to allow the roller wheels 318 of the second portion 28a to slide outward along the receiving slots 310 to accommodate the electronic device 110a. The flexible member 330 also provides a force, pressing the electronic device 110a between the lower portion 258a and the first central section 136a. When the electronic device 110a is removed, the flexible member 330 biases the second portion 28a back into contact with the first portion 26a.

As shown in FIGS. 6A-6C, it is contemplated that an inductive charger 300 may be positioned proximate the first portion 26 of the electronic device holder 10. The inductive charger 300 may be positioned on the outer surface of the first portion 26, allowing the user to charge the electronic device 110 while the electronic device 110 is received by the electronic device holder 10. The inductive charger 300 may be used on any of the exemplary illustrations shown in without departing from the scope of the present disclosure.

The electronic device holder 10, 10a provides a stable holder for the electronic device 110, 110a providing a secure location to place the electronic device 110, 110a other than pockets, cup holders, or other crevices of the cabin 54 of the vehicle 50. Because the electronic device 110, 110a is pressed securely between the buffer pad 270. 270a and the first central section 136, 136a by the flexible member(s) 32, 330, there is no rattling or risk of inadvertent movement of the electronic device 110, 110a. Further, the electronic device holder 10, 10a secures the electronic device 110, 110a upright for easy access for the user when the user needs to remove the electronic device 110, 110a. The electronic device holder may be manufactured at reduced costs when compared to electronic device holders currently in the marketplace.

According to some aspects of the present disclosure, an electronic device holder is provided that includes a housing defining an interior space and an opening. The housing includes a first portion slidably coupled to a second portion. A flexible member is positioned around the housing. A retention feature is disposed on the second portion. The retention feature extends into the interior space.

Examples of the electronic device holder can include any one or a combination of the following features:
  the first portion includes a protrusion, and further wherein the second portion defines a channel configured to receive the protrusion;
  the first portion includes first and second exterior sides including clips configured to secure the flexible member, and further wherein each of the first exterior side and the second exterior side defines a guide configured to receive the flexible member; and/or
  the retention feature is integrally formed with a first central section of the second portion.

According to some aspects of the present disclosure, an electronic device holder is provided that includes a housing defining an interior space and an opening. A retention feature is defined by the housing and extends into the interior space. A flexible member is positioned around the housing.

Examples of the electronic device holder can include any one or a combination of the following features:
  the housing further includes a first portion and a second portion;
  the first portion and the second portion are maintained in an engaged position by the flexible member;
  the first portion includes a first exterior side, a second exterior side, and flanges extending from each of the first exterior side and the second exterior side, wherein the flanges define apertures for coupling the first portion to a substrate;
  each of the first exterior side and the second exterior side includes a guide configured to receive the flexible member and clips configured to secure the flexible member, the clips vertically aligned with the guide;
  the second portion includes a first interior side and a second interior side, the first interior side and the second interior side parallel with the first exterior side and the second exterior side;
  each of the first interior side and the second interior side defines a channel;
  each of the first exterior side and the second exterior side includes a protrusion configured to be received by the channel of one of the first interior side or the second interior side;
  the flexible member is positioned to allow the second portion to slide apart from the first portion and bias the second portion toward the first portion; and/or
  the first portion and the second portion are each formed from a polypropylene material to minimize noise, squeak, or rattling.

According to some aspects of the present disclosure, an electronic device holder operably coupled to a bottom surface of a substrate is provided. The electronic device holder includes a housing defining a space and an opening. A retention feature is disposed on an inner surface of the housing and extends into the space. A flexible member is encompassing the housing.

Examples of the electronic device holder can include any one or a combination of the following features:
  the housing includes a first portion and a second portion positioned within the first portion;
  the first portion maintains contact with the second portion within the flexible member;
  the first portion includes a protrusion, and further wherein the second portion defines a channel configured to receive the protrusion;
  the first portion includes flanges, the flanges defining apertures configured to receive fasteners to secure the first portion to said substrate; and/or
  the retention feature includes a first portion proximate the opening extending a first distance into the space and a second portion disposed on an opposing side of the first portion from the opening extending a second distance into the space, the second distance greater than the first distance.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Some examples of operably coupleable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electronic device holder comprising:
   a housing defining an interior space and an opening, wherein the housing includes:
   a first portion having a first exterior side and a second exterior side; and
   a second portion having a first interior side and a second interior side, each of the first interior side and the second interior side defining a channel, wherein the first interior side and the second interior side are parallel with the first exterior side and the second exterior side;
   a flexible member positioned around the housing, wherein each of the first exterior side and the second exterior side of the first portion includes clips configured to secure the flexible member, and further wherein each of the first exterior side and the second exterior side defines a guide configured to receive the flexible member; and
   a retention feature disposed on the second portion, wherein the retention feature extends into the interior space.

2. The electronic device holder of claim 1, wherein each of the first exterior side and the second exterior side of the first portion includes a protrusion configured to be received by the channel of one of the first interior side and the second interior side.

3. The electronic device holder of claim 1, wherein the retention feature is integrally formed with a first central section of the second portion.

4. The electronic device holder of claim 1, wherein the retention feature includes a first portion proximate the opening extending a first distance into the space and a second portion disposed on an opposing side of the first portion from the opening extending a second distance into the space, the second distance greater than the first distance.

5. The electronic device holder of claim 1, wherein the retention feature includes a buffer operably coupled with a lower portion of the retention feature.

6. An electronic device holder comprising:
   a housing defining an interior space and an opening, the housing including:
   a first portion having first and second exterior sides, each of the first and second exterior sides defining a receiving slot;
   a second portion having first and second interior sides, wherein the second portion is received by the first portion and the first and second interior sides are parallel with the first and second exterior sides; and
   a plurality of prongs extending from the first and second interior sides of the second portion and configured to be received by roller wheels;
   a retention feature defined by the housing and extending into the interior space; and
   a flexible member positioned on the housing and configured to retain the second portion at least partially within the first portion in an engaged position.

7. The electronic device holder of claim 6, wherein the first portion includes flanges extending from each of the first exterior side and the second exterior side, and further wherein the flanges define apertures for coupling the first portion to a substrate.

8. The electronic device holder of claim 6, wherein each of the first exterior side and the second exterior side includes a guide configured to receive the flexible member and clips configured to secure the flexible member, the clips vertically aligned with the guide.

9. The electronic device holder of claim 6, wherein the flexible member is positioned to allow the second portion to slide apart from the first portion and bias the second portion toward the first portion.

10. The electronic device of claim 6, wherein the roller wheels are configured to be received by the respective receiving slots, and further wherein the flexible member biases the roller wheels into engagement with the receiving slots.

11. The electronic device holder of claim 6, wherein the flexible member is a horizontal flexible member, and further wherein a vertical flexible member is positioned perpendicular to the horizontal flexible member.

12. The electronic device holder of claim 11, wherein each of the first and second exterior sides includes a prop defining a pair of notches configured to receive the horizontal flexible member.

13. The electronic device holder of claim 6, wherein the retention feature includes a first portion proximate the opening extending a first distance into the space and a second portion disposed on an opposing side of the first portion from the opening extending a second distance into the space, the second distance greater than the first distance.

14. An electronic device holder operably coupled to a bottom surface of a substrate, the electronic device holder comprising:
   a housing defining a space and having an opening, the housing including:
   a first portion having a first exterior side and a second exterior side; and
   a second portion having a first interior side and a second interior side, the first and second interior sides positioned parallel with the first and second exterior sides, wherein the second portion is positioned within the first portion, and wherein one of the first and exterior sides defines a channel, and further wherein a roller wheel is operably coupled with one of the first and second interior sides, the roller wheel configured to be received by the channel;
   a retention feature disposed on an inner surface of the housing and extending into the space; and
   a flexible member encompassing the housing.

15. The electronic device holder of claim 14, wherein the first portion maintains contact with the second portion within the flexible member.

16. The electronic device holder of claim 14, wherein the first portion includes flanges, the flanges defining apertures configured to receive fasteners to secure the first portion to said substrate.

17. The electronic device holder of claim 14, wherein the retention feature includes a first portion proximate the opening extending a first distance into the space and a second portion disposed on an opposing side of the first portion from the opening extending a second distance into the space, the second distance greater than the first distance.

* * * * *